United States Patent
Li (10) Patent No.: US 8,358,994 B2
(45) Date of Patent: Jan. 22, 2013

(54) MITIGATING RADIO RECEIVER MULTIPATH NOISE

(75) Inventor: Junsong Li, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 509 days.

(21) Appl. No.: 12/623,641

(22) Filed: Nov. 23, 2009

(65) Prior Publication Data

US 2011/0044414 A1    Feb. 24, 2011

Related U.S. Application Data

(60) Provisional application No. 61/235,195, filed on Aug. 19, 2009.

(51) Int. Cl.
*H04H 40/00* (2008.01)
*H04B 1/10* (2006.01)

(52) U.S. Cl. ....... 455/296; 455/3.06; 455/225; 455/303; 455/309; 455/312

(58) Field of Classification Search ................. 455/63.1, 455/67.13, 222–225, 226.1, 226.3, 296, 303, 455/309, 3.02, 3.06, 135, 183.2, 312, 334, 455/337
See application file for complete search history.

(56) References Cited

U.S. PATENT DOCUMENTS

| | | | | |
|---|---|---|---|---|
| 4,345,241 A | | 8/1982 | Takeuchi et al. | |
| 5,068,896 A | * | 11/1991 | Short | 381/13 |
| 5,410,751 A | * | 4/1995 | Yokoyama | 455/212 |
| 6,173,166 B1 | * | 1/2001 | Whitecar | 455/296 |
| 6,233,443 B1 | * | 5/2001 | Brommer | 455/296 |
| 6,295,324 B1 | * | 9/2001 | Whikehart | 375/308 |
| 6,577,851 B1 | * | 6/2003 | Ecklund et al. | 455/223 |
| 6,744,829 B1 | | 6/2004 | Mohindra | |
| 6,925,114 B2 | * | 8/2005 | Altizer et al. | 375/227 |
| 6,944,301 B1 | * | 9/2005 | Nohrden et al. | 381/13 |
| 6,959,016 B1 | | 10/2005 | Keeth et al. | |
| 7,158,586 B2 | | 1/2007 | Husted | |
| 7,343,143 B2 | * | 3/2008 | Gamou | 455/226.1 |
| 7,440,737 B2 | * | 10/2008 | Su | 455/223 |
| 7,715,567 B2 | * | 5/2010 | Wildhagen | 381/13 |
| 7,982,683 B2 | * | 7/2011 | Peyla et al. | 343/860 |
| 8,099,073 B1 | * | 1/2012 | Muller et al. | 455/296 |
| 2004/0043730 A1 | * | 3/2004 | Schill et al. | 455/130 |
| 2004/0203551 A1 | * | 10/2004 | Li et al. | 455/296 |
| 2005/0003772 A1 | * | 1/2005 | Nemoto | 455/130 |

(Continued)

OTHER PUBLICATIONS

Keng Leong Fong, et al., "High-Frequency Nonlinearity Analysis of Common-Emitter and Differential-Pair Transconductance Stages," IEEE Journal of Solid State Circuits, vol. 33, No. 4, pp. 548-555. Apr. 1998.

(Continued)

*Primary Examiner* — Simon Nguyen
(74) *Attorney, Agent, or Firm* — Trop, Pruner & Hu, P.C.

(57) ABSTRACT

In one embodiment, a method for processing radio frequency signals includes estimating an average value of a demodulated signal and a noise signal, both obtained from a radio frequency signal, estimating a noise floor based on the noise signal, generating a blend control signal based on the average values and the noise floor, and blending at least two path signals based on the blend control signal to obtain a blended signal. This blended signal may be output for further processing when multipath noise is detected.

19 Claims, 8 Drawing Sheets

U.S. PATENT DOCUMENTS

| | | |
|---|---|---|
| 2005/0135521 A1 | 6/2005 | Nemer et al. |
| 2005/0243949 A1 | 11/2005 | Khoini-Poorfard |
| 2006/0019601 A1* | 1/2006 | Kroeger et al. ............. 455/3.06 |
| 2009/0203344 A1* | 8/2009 | Hanawalt et al. ............. 455/311 |
| 2010/0027719 A1* | 2/2010 | Pahuja ......................... 375/340 |

OTHER PUBLICATIONS

Keng Leong Fong, et al., "A Class AB Monolithic Mixer for 900 MHz Applications," IEEE Journal of Solid Stae Circuits, pp. 1166-1172, Aug. 1997.

Keng Leong Fong, et al., "2.4 Monolithic Mixer for Wireless LAN Applications," IEEE Custom Integrated Circuits Conference, pp. 9.4.1-9.4.4, May 1997.

Stefaan Van Gerven, et al., "Signal Separation by Symmetric Adaptive Decorrelation: Stability, Convergence, and Uniqueness," IEEE Transactions on Signal Processing, vol. 43, No. 7, Jul. 1995, pp. 1602-1612.

Fred Harris, "Digitial Filter Equalization of Analog Gain and Phase Mismatch in I-Q Receivers," 1996, pp. 793-796.

Stefaan Van Gerven, et al., "On The Use Of Decorrelation in Scalar Signal Separation," IEEE, 1994, pp. 57-60.

Mikko Valkama, et al., "Advanced Methods for I/Q Imbalance Compensation in Communication Receivers," IEEE Transactions on Signal Processing, vol. 49, No. 10, Oct. 2001, pp. 2335-2344.

Supisa Lerstaveesin, et al., "A Complex Image Rejection Circuit With Sign Detection Only," IEEE Journal of Solid-State Circuits, vol. 41, No. 12, Dec. 2006, pp. 2693-2702.

U.S. Appl. No. 12/493,738, filed Jun. 29, 2009, entitled, "Providing Image Rejection Calibration For a Receiver," by John Khoury, et al.

U.S. Appl. No. 12/317,786, filed Dec. 30, 2008, entitled, "Controllable Image Cancellation in a Radio Receiver," by Junsong Li.

* cited by examiner

MITIGATING RADIO RECEIVER MULTIPATH NOISE

This application claims priority to U.S. Provisional Patent Application No. 61/235,195 filed on Aug. 19, 2009 in the name of Junsong Li entitled FM RECEIVER MULTIPATH NOISE MITIGATION SCHEME.

BACKGROUND

A known impairment in radio receivers is multipath noise. Such noise is present where an antenna of the receiver receives a desired channel from multiple paths, e.g., as reflected off of buildings, other structures or geographical features. This noise may manifest itself as audio clicking or popping, or by causing a disruption of the signal.

One technique for mitigating multipath noise is to perform a hard mute, in which the radio output is silenced when the noise is detected. However problems with the hard mute include volume changes that may occur and/or if the mute is too long, an audible mute can occur.

SUMMARY OF THE INVENTION

According to one aspect, the present invention is directed to a digital signal processor (DSP) to receive a digitized signal representative of an incoming radio frequency (RF) signal and demodulate the digitized signal to provide a digital audio output. In one implementation, the DSP has parallel paths including a first path with a high cut circuit to filter the demodulated signal and a second path having a low pass filter (LPF) to filter the demodulated signal. A controller, e.g., of the DSP may control blending of the high cut circuit output and the LPF output when multipath noise is present in the RF signal. The controller may process the demodulated signal, a filtered version of the demodulated signal, and a noise signal to generate a blend control signal that controls the blending.

Another aspect is directed to a method for estimating a RMS value of a demodulated signal and a noise signal, both obtained from a RF signal, estimating a noise floor based on the noise signal, generating a blend control signal based on the RMS values and the noise floor, and blending at least two path signals based on the blend control signal to obtain a blended signal. This blended signal may be output for further processing when multipath noise is detected, while in the absence of such noise, no blending occurs and the output is the first path signal.

A still further aspect is directed to a system that includes an antenna to receive a RF signal and a radio receiver coupled to the antenna to receive and process the RF signal to output an audio signal. The receiver, which may be a single chip semiconductor die in some implementations, may include an analog front end to receive and downconvert the RF signal to a baseband signal and an analog-to-digital converter to convert the baseband signal to a digitized signal. In turn a DSP which may be configured on the same die to demodulate the digitized signal and provide a digital audio output may have parallel paths. These paths may include a first path to filter the demodulated signal with a variable bandwidth and a second path to filter the demodulated signal with a fixed bandwidth. In addition, a controller can be coupled to the parallel paths to control blending of the first and second paths when multipath noise is present in the RF signal.

DETAILED DESCRIPTION

Embodiments may provide techniques for reducing or removing multipath noise present in a received radio frequency (RF) signal. Such multipath noise may be present when a radio receiver receives a desired channel from multiple sources such as due to echoing of signals. In the presence of such interfering signals, various signal degradations can occur, leading to audible interference which may be in the form of dropouts, popping, clicking or other audio impairments. As will be described below, embodiments may implement a transition blending technique to blend processed signals of parallel paths when multipath noise is detected. By blending signals from these multiple paths, an improved signal output can be realized, without suffering from audio dropouts or other impairments, while avoiding the need to perform a hard mute.

Figure 1:
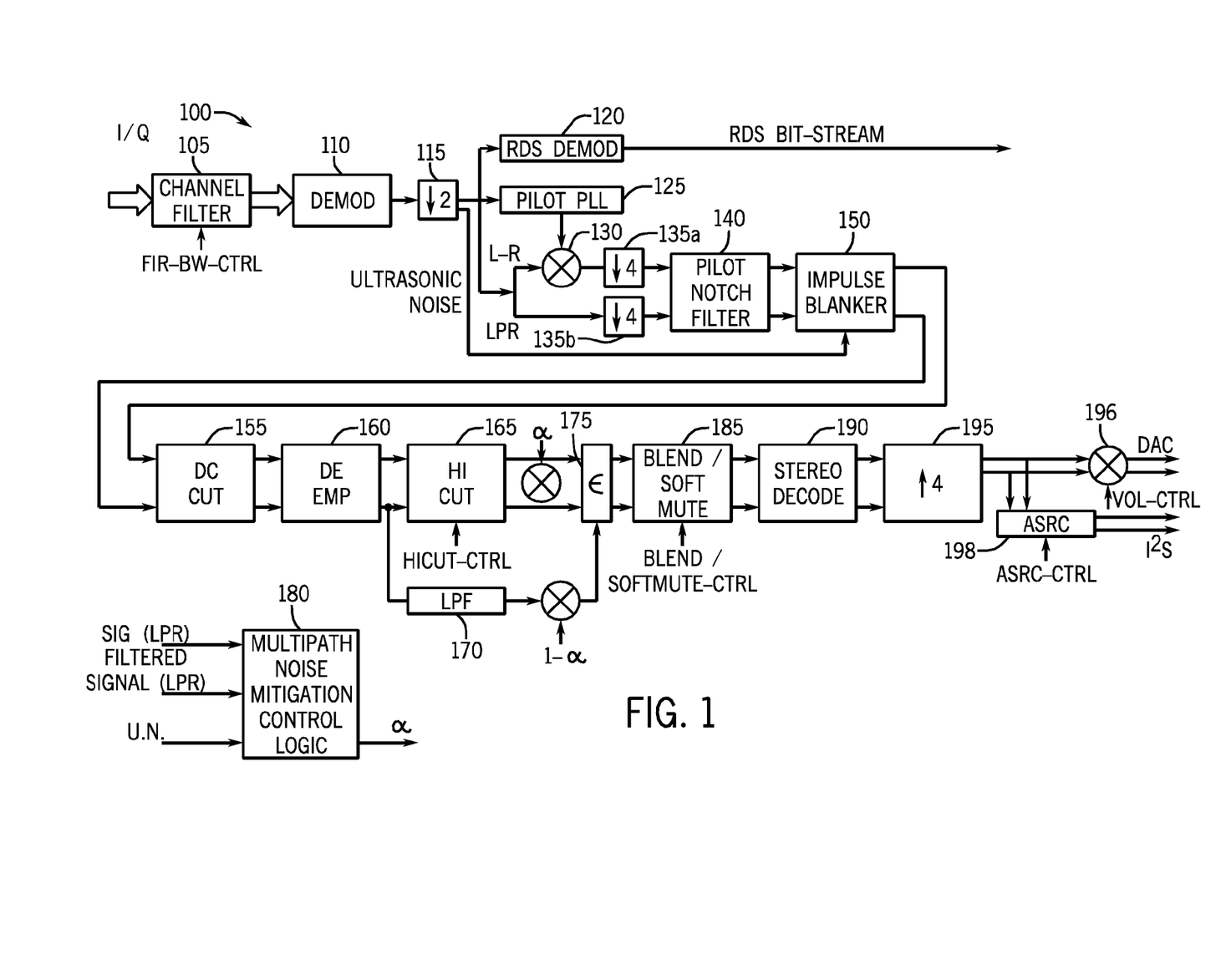
FIG. 1 is a block diagram of a portion of a digital signal processor in accordance with one embodiment of the present invention.

Referring now to FIG. 1, shown is a block diagram of a portion of a digital signal processor in accordance with one embodiment of the present invention. As shown in FIG. 1, DSP 100 may be part of a single die semiconductor device including both analog and digital circuitry. As an example, a complementary metal oxide semiconductor (CMOS) die can be a mixed-signal device to handle receipt and processing of incoming RF signals. In different implementations, the receiver may be a multi-band receiver such as an amplitude modulation (AM)/frequency modulation (FM)/weatherband (WB) receiver, although the scope of the present invention is not limited in this regard. Note that the full receiver signal processing path is not shown for ease of illustration in FIG. 1. Instead, FIG. 1 is directed only to the DSP portion of the receiver, as techniques in accordance with an embodiment of the present invention may be performed wholly within a DSP or other programmable logic. An analog front end including various filtering, mixing, signal processing and analog-to-digital conversion circuitry may be present to receive and process an RF signal before providing it to the DSP. While not shown for ease of illustration, also understand that the DSP may be part of a multi-function device including both receive and transmit capabilities. In addition, the receiver may include a storage such as a non-volatile storage including software, firmware, or combinations thereof to enable the DSP or other circuitry to operate in AM/FM/WB modes, and may further enable transmission as well as reception operations.

Referring now to FIG. 1, the DSP signal processing path may receive incoming I and Q signals at a relatively high sampling rate (e.g., at 372 kilosamples per second (KS/s)). These incoming signals may be filtered in a channel filter 105, which may be a finite impulse response (FIR) filter having a controllable bandwidth. The filtered signals may be provided to a demodulator 110. The embodiment of FIG. 1 is explained relative to an FM demodulator and thus operates on FM signals, although embodiments may implement multipath noise mitigation for other bands as well. The FM demodulated signals are provided to a decimator, which may reduce the sampling rate to a lower rate. In the embodiment shown, a decimation by two may be performed to realize sampled signals at a lower rate of 186 KS/s. As seen, the signal path may be provided to a radio data system (RDS) demodulator 120 to obtain an RDS bit stream. In addition, the signal path may be provided to a pilot phase lock loop (PLL) 125 which generates a 38 kHz carrier that is provided to a mixer 130. In addition, the demodulated signal may be filtered (not shown in FIG. 1) to obtain an ultrasonic noise signal, which as will be discussed further below may be provided to multipath noise mitigation circuitry, in addition to an impulse blanker 150. In one embodiment, the noise signal may be obtained via a filtering operation on the demodulated signal, such as via a high pass filter or a bandpass filter.

Still referring to FIG. 1, the main signal processing path may generate complementary signals, including a first signal that is provided to mixer 130 for downmixing with the carrier signal from pilot PLL 125. In one embodiment, this first signal may be a left minus right channel signal (L−R). A second signal may be a left and right channel signal (LPR) that is directly provided to a decimator $135_b$, which may again reduce the sampling rate. Decimators 135 may reduce the sampling rate to approximately 46.5 kilosamples per second. In turn, the decimated signals are provided to a pilot notch filter 140 which performs notch filtering on the signals, which are then provided to an impulse blanker 150 that performs impulse blanking. The ultrasonic noise signal can be used in blanker 150 to extract impulse-type noise and control the blanking action of the impulse noise.

The processed signals may then be provided to a DC cutter 155 and then a de-emphasis block 160. The DC cutter is used to remove DC offset due to carrier frequency error, while the de-emphasis block is used to compensate for a pre-emphasis filter used at the transmitter. In turn, the signals may be provided to parallel paths, namely a first path including a high cut block 165 and a second path including a low pass filter (LPF) block 170. In one embodiment, high cut block 165 may be used to reject high frequencies in the audio signal, with a variable bandwidth LPF pair. In one embodiment, LPF 170 may be a fixed bandwidth, e.g., 1.5 kHz to 4 kHz, low pass filter. The RF signal strength may be used to control the high-cut filter bandwidth. The outputs of these two paths may be combined or blended to implement multipath noise mitigation in accordance with an embodiment of the present invention. The two paths may be combined in a summer 175. Note that the blending or combination of these two paths may be based on a control signal from a control logic 180, details of which will be discussed further below. This blending or switching of the second path into the main or first path may occur at a relatively fast rate to handle a multipath noise event.

The blended signals may be provided to a further blending/ soft mute block 185 When the RF signal is weak, block 185 may generally act to attenuate the L−R path signal to minimize the noise effect, before the L−R signal is combined with the LPR signal. In addition, soft-mute also can be used to maintain a constant noise level, under weak signal conditions. The output of this block may be provided to a stereo decoder 190, the stereo outputs of which may be interpolated in an interpolator 195 to increase the sample rate. The resulting signals, which may be volume controlled in a mixer 196, may then be output for conversion back to analog signals for audio output. In addition, these signals may be provided through an asynchronous sampling rate converter (ASRC) 198 to convert one sampling rate digital audio to another one with a different sampling rate and provided via a serial bus such as an I²S bus. While shown with this particular implementation in the embodiment of FIG. 1, understand the scope of the present invention is not limited in this regard.

As further seen in FIG. 1, control logic 180 receives several different input signals, namely the left plus right signal, a filtered version of the left plus right signal (which may be high pass filtered as discussed further below) and the ultrasonic noise signal. Based on this information, control logic 180 may generate a blending signal, α, which may be used to blend the outputs of LPF 170 and high cut block 165. Note that in the absence of multipath interference, the control signal may be set at a value such that no blending occurs and the output of high cut block 165 is provided for further processing, without any blending from the output of LPF 170. When such interference is detected however, the signal to be provided for further processing may be a blend or combination of the outputs from high cut block 165 and LPF 170.

Figure 2:
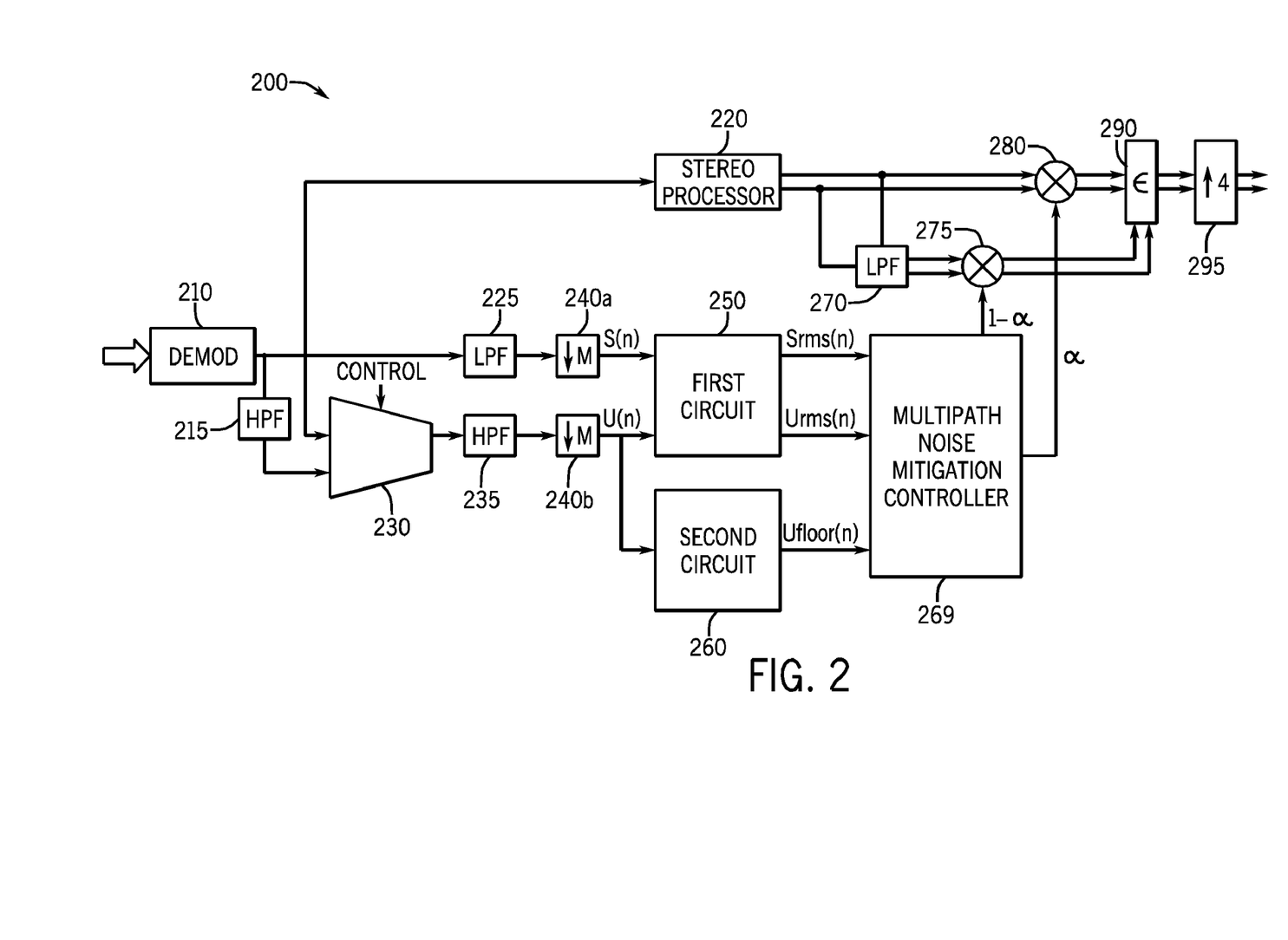
FIG. 2 is a block diagram of a multipath noise mitigation control logic in accordance with an embodiment of the present invention.

Referring now to FIG. 2 shown is a block diagram of a multipath mitigation control logic in accordance with an embodiment of the present invention. As shown in FIG. 2, signal path 200 includes a demodulator 210 that receives and demodulates incoming I and Q signals. The demodulated output may be provided to a stereo processor 220, which may correspond to a significant portion of the signal processing path shown in FIG. 1. In addition, the demodulated signal is provided to a LPF 225 and a multiplexer 230. In addition a high pass filtered version of the demodulator output via a high pass filter (HPF) 215 is also provided to multiplexer 230. Based upon control of multiplexer 230 one of these two signals may be provided to another HPF 235. In one embodiment, multiplexer 230 may be controlled such that if the incoming signal strength is relatively large, the unfiltered demodulated signal output from demodulator 210 may be provided to HPF 235. In one embodiment, HPF 215 may have a high-pass corner frequency of about 100 kHz, while HPF 235 may have an equivalent high-pass corner frequency of 10 kHz. Usually, under weak signal conditions, HPF 215 output may have too much noise to be useful. In this case, HPF 235 is used to provide high frequency noise estimation.

Both signal paths may be decimated in a corresponding decimator 240, which may provide for controllable decimation. In some embodiments, the decimation may be by 4 or 8, although the scope of the present invention is not limited in this regard. As seen, the top path in FIG. 2 corresponds to a signal path (S(n)), while the lower signal path corresponds to a noise signal path (U(n)). However, in the presence of a weak signal strength, the signal may be high pass filtered in HPF 235 and that filtered output may be selected. In such implementations, the HPF may thus provide a bandwidth of approximately 10 kHz through the filter.

Still referring to FIG. 2, the signal and noise paths may be provided to a first circuit 250, which may perform RMS estimation as well as to implement a fast attack/slow decay control scheme. Note that the noise path may further be provided to a second circuit 255 which may perform an RMS estimation of the noise floor. The outputs of these circuitries may be provided to a multipath noise controller 260, operation of which will be discussed below. As seen, the output of controller 260 may be a control signal that is used to perform blending of parallel paths of the main data processing path. Specifically, stereo processed signals of the main data path may be provided to a multiplier 280, where they are multiplied with a control signal namely the value α, while filtered signals of the main signal path output by LPFs 270 may be multiplied in a multiplier 275 with a second control signal (e.g., corresponding to 1−α). The outputs of the two multipliers may be summed in a summer 290, which combines the two paths to provide a multipath noise mitigated signal, which can be provided to interpolator 295. While shown with this particular implementation in the embodiment of FIG. 2, the scope of the present invention is not limited in this regard.

Figure 3:
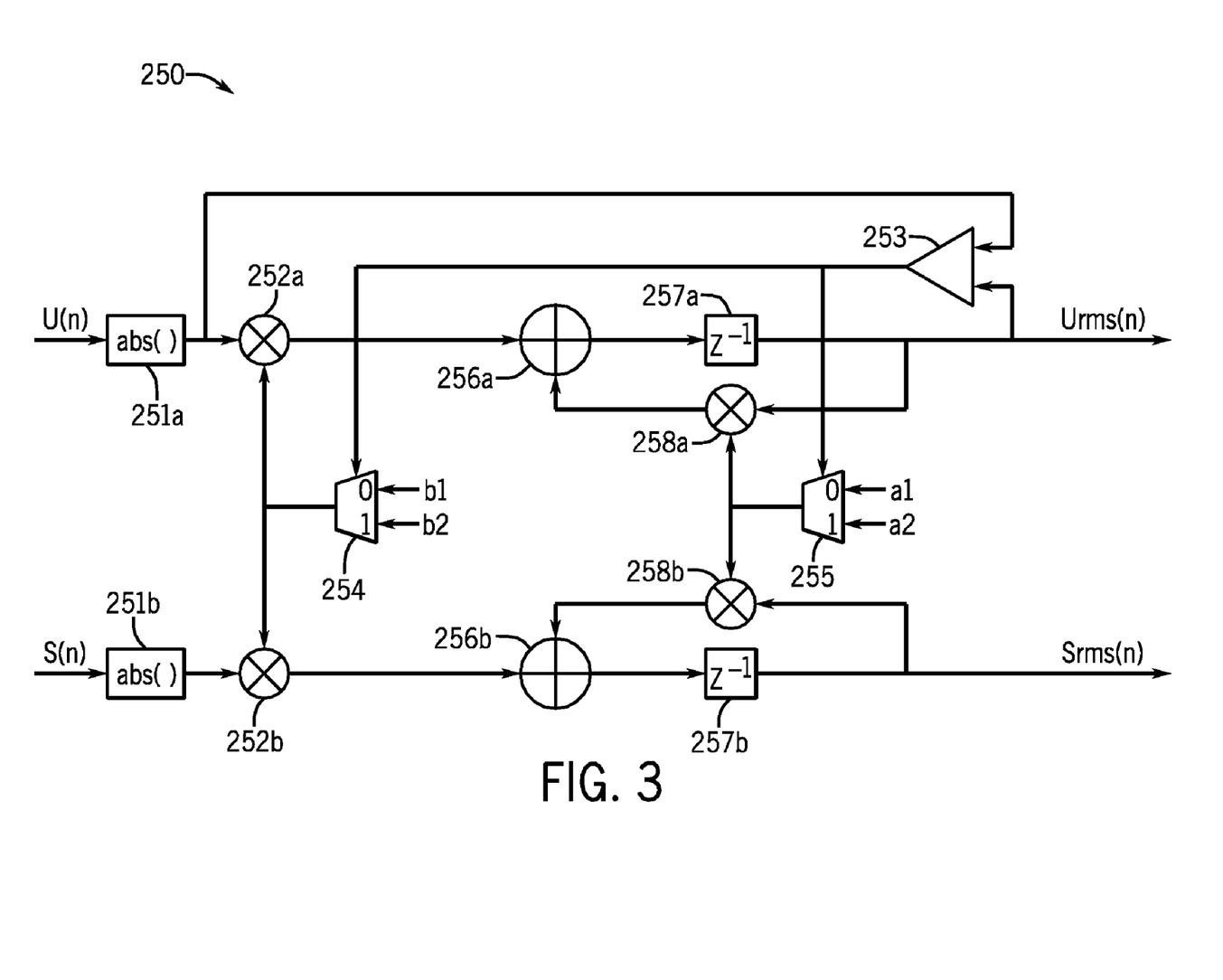
FIG. 3 is a block diagram of an RMS estimator in accordance with one embodiment of the present invention.

Referring now to FIG. 3, shown is a block diagram of details of an RMS estimator in accordance with one embodiment of the present invention. In general, estimator 250 performs a filtering function on the two signal paths. The filtering function may be realized by a combination of multipliers, coefficients, summers, and delay elements. As shown in FIG. 3, estimator 250 may correspond to first circuit 250 of FIG. 2. As seen, estimator 250 is coupled to receive the incoming signal path signal and the noise path signal. Each signal may have an absolute value of its instantaneous value determined in an absolute value function 251. In turn, the corresponding absolute value signals may be provided to each of a pair of multipliers 252, which operate to multiply the absolute value by a selected coefficient. The selection of a coefficient may be made by a multiplexer 254, which is controlled via an output of a comparator 253. In one embodiment, the coefficients may be stored in a non-volatile storage of the DSP. Comparator 253 operates to compare the instantaneous noise signal output from the absolute value function $251_a$ with an RMS value of the noise signal.

Still referring to FIG. 3, the output of multipliers 252 may be summed in a corresponding summer 256 with a feedback value that is provided from a delay element 257. As seen, the value from this delay element may itself be multiplied in a corresponding one of a second pair of multipliers 258 with a given coefficient output by a multiplexer 255, which again is controlled by the comparator output. In the embodiment shown in FIG. 3, the filter bandwidth may be dependent on the comparison between the instantaneous noise value and the RMS noise value. When the instantaneous noise value is less than the average noise value, the multiplexers may be selected to select coefficients A1 and B1, which provide a relatively slow bandwidth (3 dB bandwidth) of around 100 Hz. In contrast, when the instantaneous value is greater than the RMS noise value, the multiplexers may select coefficients B2 and A2, which may have a relatively higher bandwidth (3 dB bandwidth), e.g., of around 500 Hz. Table 1 below shows an example of pseudo code implemented in estimator 250 in accordance with an embodiment of the present invention.

TABLE 1

Figure 4:
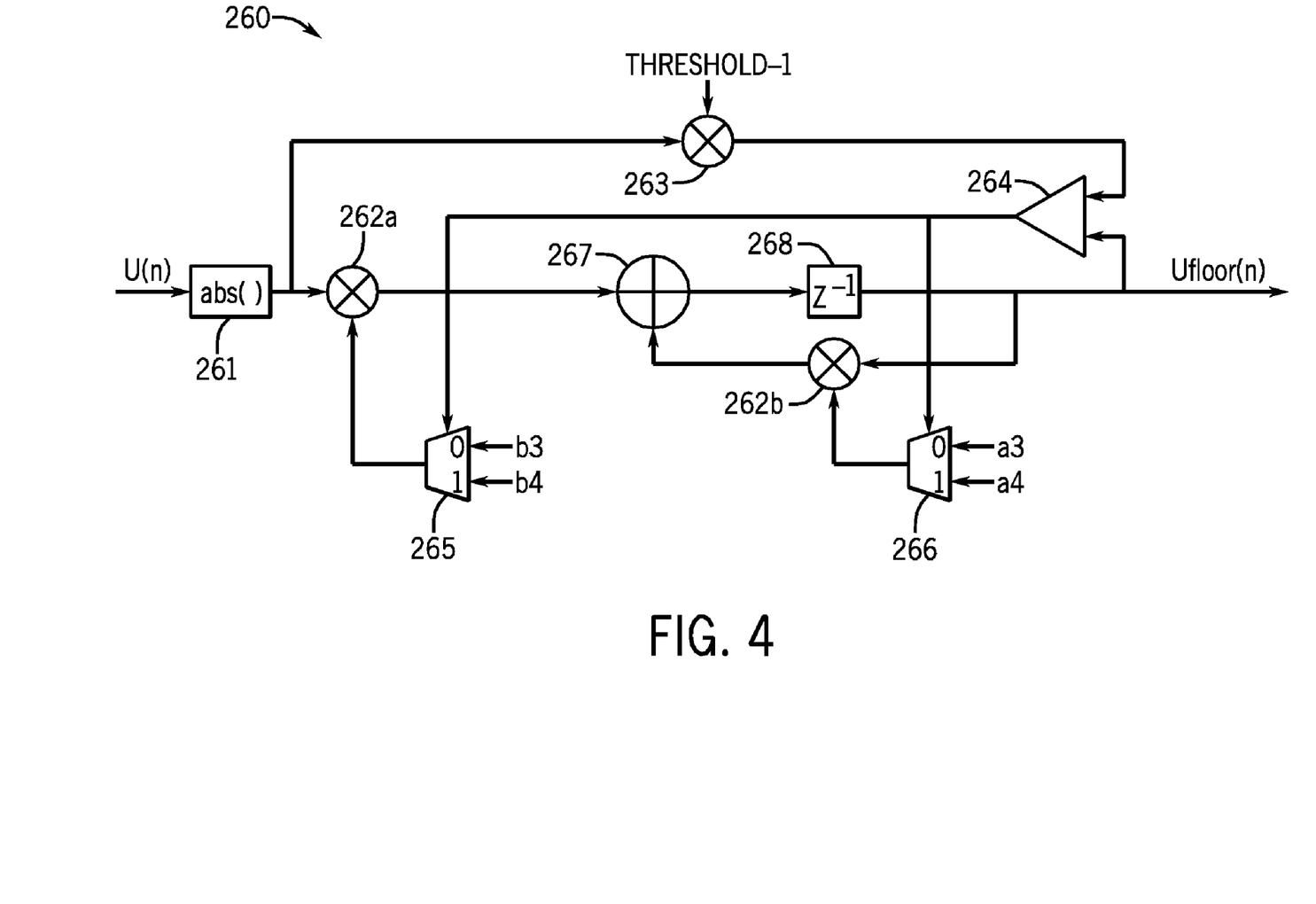
FIG. 4 is a block diagram of a noise floor estimator in accordance with one embodiment of the present invention.

If abs (U(n)) < Urms(n)
   select LPF (b1, a1);
else
   select LPF (b2, a2);
end Referring now to FIG. 4, shown is a block diagram of a noise floor estimator in accordance with one embodiment of the present invention. As shown in FIG. 4, estimator 260 may correspond to second circuit 260 of FIG. 2. As seen, estimator 260 is coupled to receive the incoming noise signal, U(n), and calculate the absolute value of this instantaneous signal in an absolute value function 261. As seen, the instantaneous value may be provided to two different multipliers, namely a first multiplier 262 and a second multiplier 263. Multiplier 263 may multiply the instantaneous noise value with a threshold (threshold −1), the output of which is provided to a comparator 264, which acts to compare this thresholded instantaneous value with the noise floor value $U_{FLOOR}(n)$. In one embodiment, the threshold value may be a predetermined percentage of the instantaneous noise value. As one example, the threshold may be set to be between approximately 10% and 30% of the instantaneous noise value. Based on the comparison, one of a different set of coefficients may be provided to perform the filtering implemented in estimator 260. As seen, a first multiplexer 265 and a second multiplexer 266 may provide outputs to the two different signal path multipliers 262a and 262b. As seen, the output of multiplier 262a may be summed in a summer 267 with a feedback value that is provided from a delay element 268 through multiplier 262b to thus generate the noise floor value $U_{FLOOR}(n)$. In the embodiment of FIG. 4, when the comparison of the instantaneous thresholded value is greater than the floor value, a first set of coefficients (A4 and B4) may be selected to provide a lower (3 dB) bandwidth, e.g., of approximately 50 Hz, while when the thresholded value is less than the floor value, a relatively higher (3 dB) bandwidth, e.g., of around 150 Hz may be selected via coefficients A3 and B3. In this way, the noise floor value fluctuates slowly such that if there is a larger instantaneous change, it does not affect the noise floor value. Table 2 below shows an example of pseudo code implemented in estimator 260 in accordance with an embodiment of the present invention.

Figure 5:
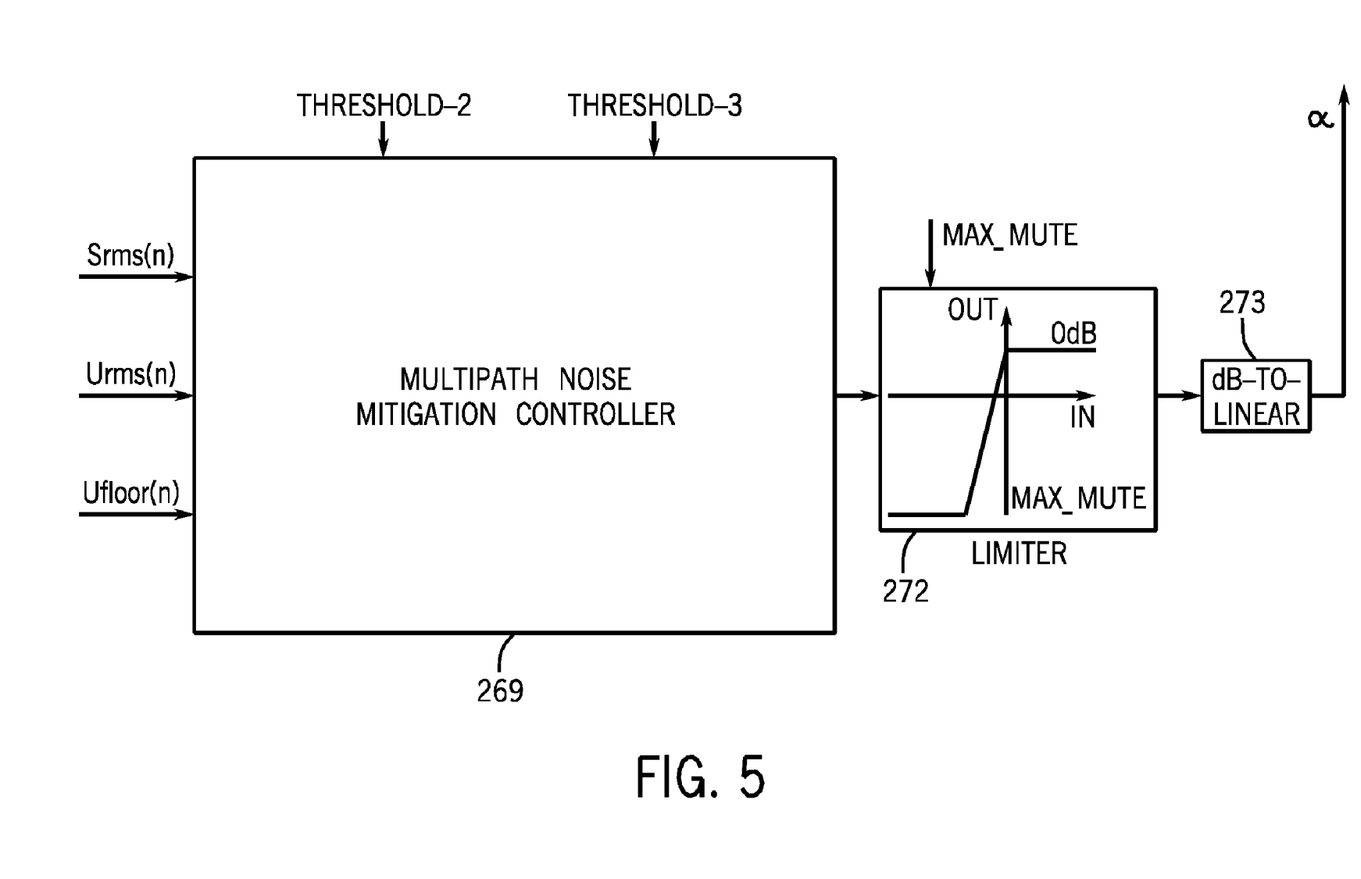
FIG. 5 is a block diagram of a multipath noise mitigation controller in accordance with one embodiment of the present invention.

TABLE 2 if abs (U(n)) * threshold −1 > Ufloor(n)
   select LPF (b4, a4)
else
   select LPF (b3, a3);
end Referring now to FIG. 5, shown is a block diagram of a multipath noise mitigation controller 269. As seen, controller 269 may receive various inputs, namely the RMS values for the signal and noise values, as well as the noise floor value. The controller may further receive additional thresholds to use in processing. Based on the strengths of the signal and noise RMS values, noise floor value, and thresholds, an alpha value may be determined and output to a limiter 272, which may limit the amount of the control signal, e.g., based on a maximum mute control input. In one embodiment, this control input may be at a predetermined value, and may be used to control the maximum attenuation of the main path signal (i.e., the output of high cut block 165 of FIG. 1). Then the limited output, which may be in units of dB, may be converted to a linear value in a converter 273. The output of converter 273 may be the alpha value that can be provided, in a direct manner (i.e., α) and in an inverse manner (i.e., 1−α) to the parallel signal paths shown in FIG. 1. Table 3 below shows an example of pseudo code implemented in controller 269 in accordance with an embodiment of the present invention.

TABLE 3 if (Ufloor(n)) > threshold −2) &&
   (Srms(n) * threshold −3 < Urms(n)) )
   g_mute_dB(n) = g_mute_dB(n−1) − step_dB
else
   g_mute_dB(n) = g_mute_dB(n−1) + step_dB
end In one embodiment, the value of g_mute may be initialized at zero, and may be controllably incremented/decremented by the step value (which in one embodiment may be between 10 dB/second and 1000 dB/second) based on the calculations performed. When a high level of ultrasonic noise is detected, which indicates that audio signal quality is poor, the fixed LPF filtered signal is switched into the data path quickly to minimize noise impacts. In contrast, when the high frequency noise level becomes weak and less dominating, a slow transition will put back the original signal to the audio path for further processing.

Figure 6:
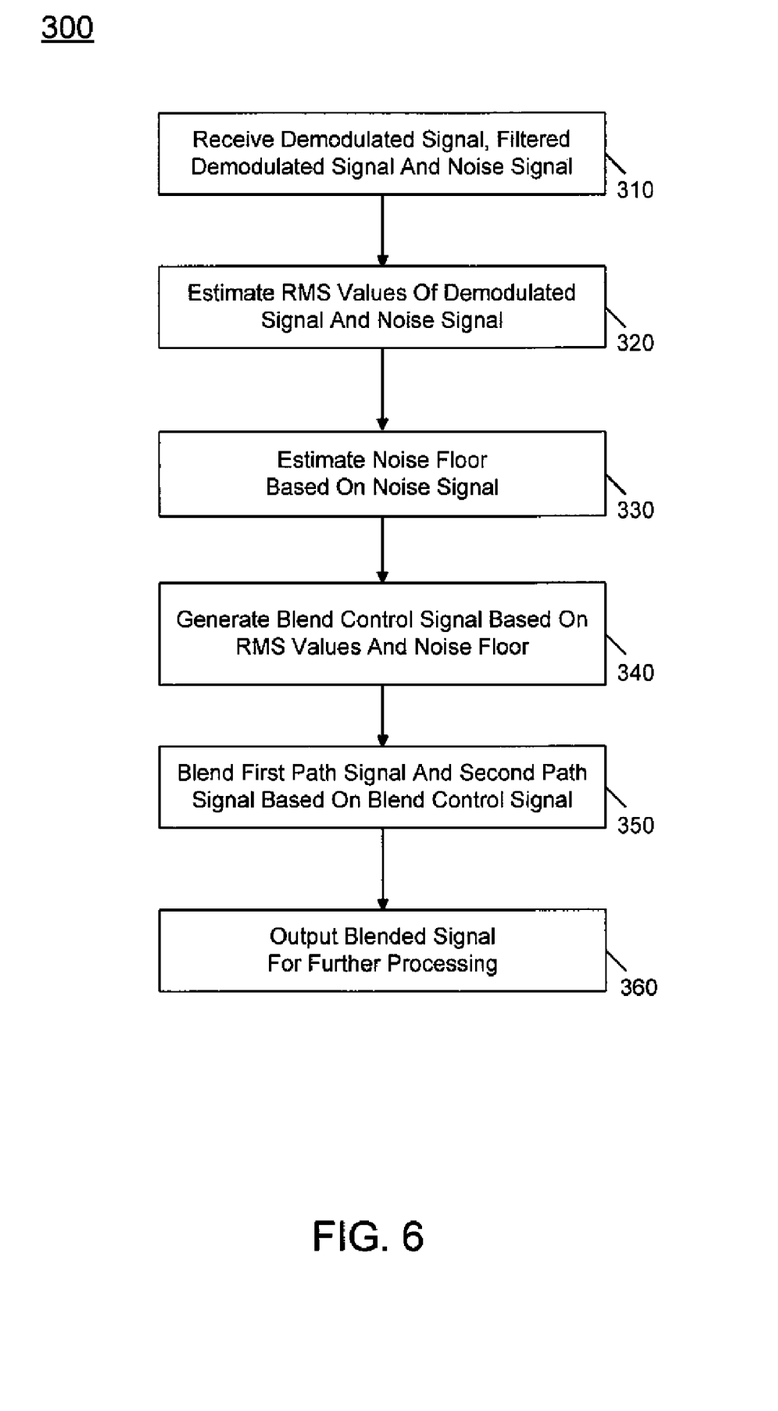
FIG. 6 is a flow diagram of a method in accordance with one embodiment of the present invention.

Referring now to FIG. 6, shown is a flow diagram of a method in accordance with one embodiment of the present invention. Method 300 of FIG. 6 may be performed in a DSP of a single chip radio receiver. As seen, method 300 may begin by receiving a demodulated signal, a filtered demodulated signal, and a noise signal (block 310). Specifically, control circuitry for multipath noise mitigation may receive these signals, all of which may be generated from the demodulated signal. Specifically, the filtered demodulated signal may be a high pass filtered version of the demodulated signal that can be used in low signal-to-noise conditions. In addition, the noise signal may be another filtered version of the demodulated signal, e.g., via a bandpass or high pass filter.

Still referring to FIG. 6, next RMS values of the demodulated signal and the noise signal may be estimated (block 320). The RMS values may be generated by obtaining absolute values of the signals, and applying the signals through a controllable bandwidth filter based on the level of the instantaneous demodulated signal as compared to the RMS value of the demodulated signal. Also, a noise floor may be estimated based on the noise signal (block 330). This noise floor may also be determined using a controllable filter based on a comparison of the instantaneous noise value and the noise floor.

Then at block 340, a blend control signal can be generated based on the RMS values and the noise floor. Specifically, the noise floor value may be compared to a threshold, and a thresholded version of the demodulated signal RMS value may be compared to the noise signal RMS value and the blend control signal is generated based on that comparison. Then first and second path signals may be blended based on this blend control signal (block 350). For example, with reference back to FIG. 1, the main path signal output from high cut block 165 may be combined with the parallel path signal output from LPF 170. The amount of blending may be based on the blend control signal. In one embodiment, the blend control signal, $\alpha$, may be multiplied with the main path output and an inverse value of $\alpha$ (i.e., $1-\alpha$) may be multiplied with the parallel path output. These two products may then be combined, e.g., in a summer and then output for further processing (block 365). For example, stereo decoding, volume control and so forth may be performed before converting the digital audio signal back to the analog domain for output from a speaker or other output device. While shown with this particular implementation in the embodiment of FIG. 6, the scope of the present invention is not limited in this regard.

Figure 7:
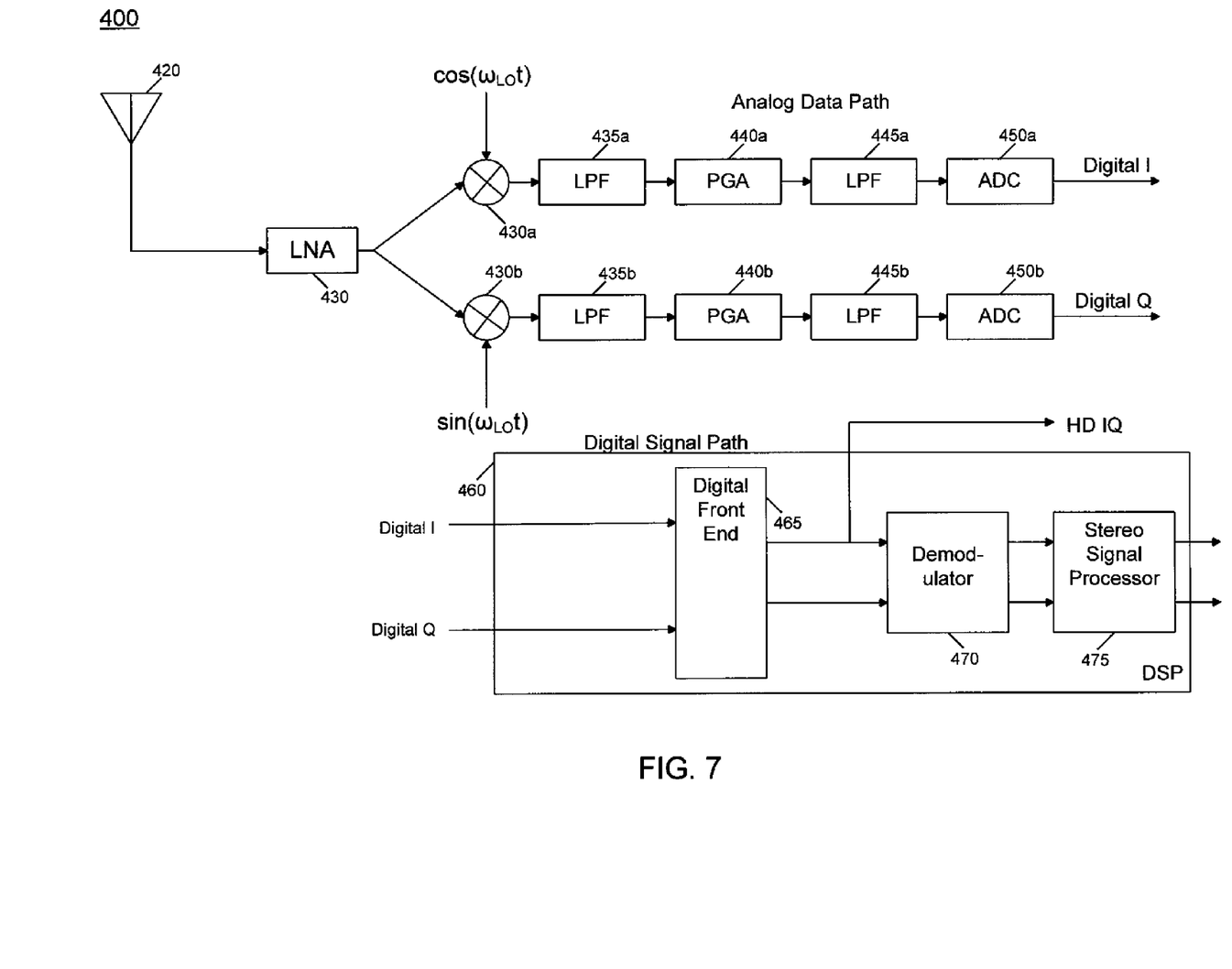
FIG. 7 is a block diagram of a receiver in accordance with one embodiment of the present invention.

Embodiments may be implemented in many different types of receivers including receivers having a DSP-based signal processor. Referring now to FIG. 7, shown is a block diagram of a receiver in accordance with one embodiment of the present invention. As shown in FIG. 7, receiver 400 may be of a low-intermediate frequency (IF) receiver architecture. In the embodiment of FIG. 7, receiver 400 is coupled to receive an RF signal via an antenna 420 that in turn is coupled to a low noise amplifier (LNA) 430. In turn, the RF signal may be provided to mixers $430_a$ and $430_b$. As seen in FIG. 7, the receiver may have a complex signal architecture having separate in-phase (I-phase) and quadrature (Q-phase) phases, such that separate paths for I and Q-phases are provided. This is realized by mixers 430, each of which mix the received RF signal with a local oscillator (LO) frequency at different phases, namely 90° apart. In the embodiment of FIG. 7, mixers 430 may mix the incoming signal with a local oscillator frequency to generate an IF signal. In various implementations, this IF signal may be between approximately 120 and 250 kilohertz (kHz). For example, in one embodiment, for FM/AM/WB the IF signal can be fixed at 120 kHz, while for high definition (HD) audio it can be fixed at 250 kHz, although the scope of the present invention is not limited in this regard.

Various analog processing may then be performed on the IF signals. Specifically, each of the I and Q paths may include a first LPF 435, a programmable gain amplifier (PGA) 440 and a second LPF 445. The resulting signal is then provided to an analog-to-digital converter (ADC) 450, which converts the analog IF signals to digital I and Q signals, which may then be provided to a digital portion of the receiver. Note that while in many implementations receiver 400 may be configured as a single integrated circuit, e.g., a CMOS device configured on a single semiconductor die, the scope of the present invention is not limited in this regard.

The digital information may be provided to a digital portion of the receiver which may include a DSP 460 having a digital front end 465 that may perform various digital processing to prepare the signals for demodulation in a demodulator 470, which may thus demodulate the signals and provide demodulated data to a desired location. In addition, DSP 460 may include a stereo signal processor 475 that may perform stereo and other processing on the demodulated signals. Such processing may include multipath noise mitigation in accordance with an embodiment of the present invention. While shown with this particular implementation in the embodiment of FIG. 7, the scope of the present invention is not limited in this regard.

Figure 8:
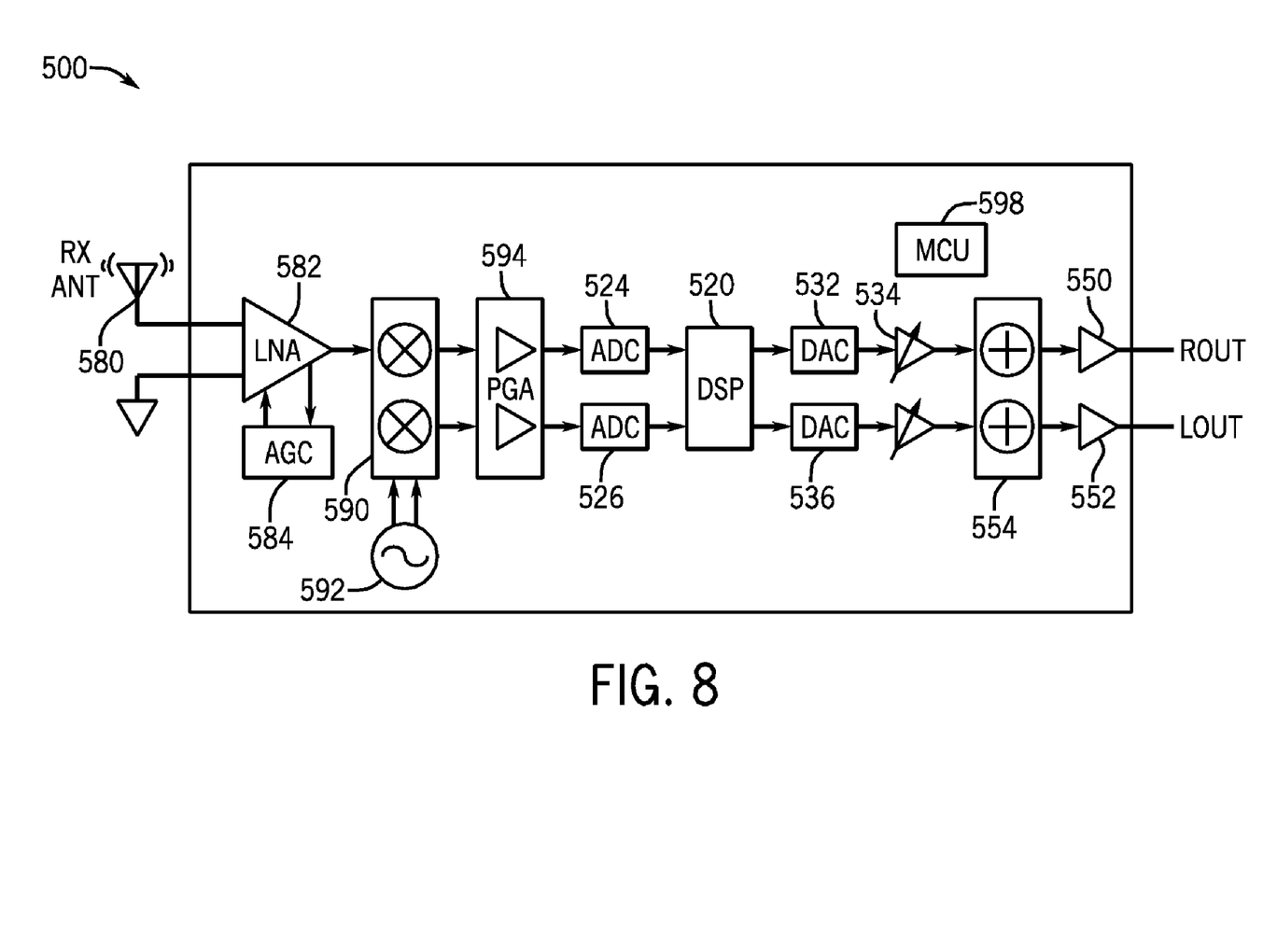
FIG. 8 is a block diagram of a multi-band receiver system in accordance with an embodiment of the present invention.

Embodiments may be implemented in many different receivers, transceivers and so forth. In some implementations, a radio receiver capable of both AM and FM receive modes, among others, may implement embodiments of the present invention. Referring now to FIG. 8, shown is a block diagram of a multi-band receiver system 500 in accordance with an embodiment of the present invention. In one embodiment, system 500 may be a mobile radio such as a car radio. As shown in FIG. 8, a multimode combined AM/FM/WB receiver 500 may be fabricated on a monolithic semiconductor die.

An incoming RF signal is received from an external receive antenna 580 through a LNA 582 controlled by an automatic gain control (AGC) circuit 584. After processing, left channel (called "LOUT") and right channel (called "ROUT") analog stereo signals appear at output terminals 552 and 550, respectively.

The multimode receiver 500 includes analog mixers 590 that are coupled to a tunable local oscillator 592, the frequency of which selects the desired radio channel to which the receiver 500 is tuned. In response to the incoming RF signal, the mixers 590 produce corresponding analog IF, quadrature signals that pass through PGAs 594 before being routed to the ADCs 524 and 526. Thus, the ADCs 524 and 526 convert the analog IF quadrature signals from the PGAs 594 into digital signals, which are provided to a DSP 520.

The DSP 520 demodulates the received complex signals and processes them as described above to provide corresponding digital left and right channel stereo signals at its output terminals; and these digital stereo signals are converted into analog counterparts by DACs 532 and 536, respectively, which are coupled to programmable gain amplifiers 534. A microcontroller unit (MCU) 598 may perform control operations for setting a mode of operation and control of controllable features of the receiver.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a digital signal processor (DSP) to receive a digitized signal representative of an incoming radio frequency (RF) signal and to demodulate the digitized signal and to provide a digital audio output, the DSP including a first path having a high cut circuit to filter the demodulated signal and a second path having a low pass filter (LPF) to filter the demodulated signal, and control logic to control blending of the high cut circuit output and the LPF output when multipath noise is present in the RF signal.

2. The apparatus of claim 1, wherein the control logic is coupled to receive the demodulated signal, a filtered version of the demodulated signal, and a noise signal and to generate a blend control signal, wherein the blend control signal is to control blending of the high cut circuit output and the LPF output.

3. The apparatus of claim 2, wherein the control logic includes a first circuit to generate an average value of the demodulated signal and the noise signal, wherein the first circuit includes a first controllable filter to filter the demodulated signal to obtain the average value of the demodulated signal and a second controllable filter to filter the noise signal to obtain the average value of the noise signal, wherein a bandwidth of the first and second controllable filters is based on a comparison between the average value of the noise signal and the noise signal.

4. The apparatus of claim 3, wherein the bandwidth is set at a first value if the noise signal is less than the average value of the noise signal and the bandwidth is set at a second value if the noise signal is greater than the average value of the noise signal, wherein the first value is less than the second value.

5. The apparatus of claim 2, wherein the control logic includes a second circuit to generate a noise floor based on the noise signal, wherein the second circuit includes a controllable filter to filter the noise signal to obtain the noise floor, wherein a bandwidth of the controllable filter is based on a comparison between the noise floor and a thresholded noise signal.

6. The apparatus of claim 5, wherein the bandwidth of the controllable filter is set at a first value if the thresholded noise signal is greater than the noise floor and at a second value if the thresholded noise signal is less than the noise floor, wherein the first value is less than the second value.

7. A method comprising:
estimating a RMS value of a demodulated signal and a noise signal, both obtained from a radio frequency (RF) signal received by a radio receiver;
estimating a noise floor based on the noise signal;
generating a blend control signal based on the RMS values and the noise floor; and
blending a first path signal and a second path signal based on the blend control signal to obtain a blended signal.

8. The method of claim 7, further comprising outputting the blended signal for further processing.

9. The method of claim 7, further comprising not blending the second path signal with the first path signal if multipath noise is not detected.

10. The method of claim 7, further comprising filtering the first path signal with a controllable filter having a variable bandwidth before the blending and filtering the second path signal with a filter having a fixed bandwidth before the blending, wherein the first path signal and the second path signal are obtained from the demodulated signal.

11. The method of claim 10, further comprising determining an absolute value of the demodulated signal, multiplying the absolute value with a first controllable coefficient to obtain a first product and adding the first product to a second product of a stored sample value and a second controllable coefficient, and outputting the sum as the RMS value of the demodulated signal.

12. The method of claim 7 wherein generating the blend control signal includes:
determining whether the noise floor is greater than a first threshold and whether the RMS value of the demodulated signal is greater than the RMS value of the noise signal; and
if so, decrementing the blend control signal, otherwise incrementing the blending control signal.

13. A system comprising:
an antenna to receive a radio frequency (RF) signal; and
a radio receiver coupled to the antenna to receive and process the RF signal to output an audio signal, the radio receiver including:
an analog front end to receive the RF signal and down-convert the RF signal to a baseband signal;
an analog-to-digital converter (ADC) to convert the baseband signal to a digitized signal; and
a digital signal processor (DSP) to receive and demodulate the digitized signal and to provide a digital audio output, the DSP having parallel paths including a first path to filter the demodulated signal with a variable bandwidth and a second path to filter the demodulated signal with a fixed bandwidth, and a controller coupled to the parallel paths to control blending of the first and second paths when multipath noise is present in the RF signal.

14. The system of claim 13, wherein the DSP further includes:
a first multiplier to multiply a signal of the first path with a first control value;
a second multiplier to multiply a signal of the second path with a second control value; and
a combiner to combine outputs of the first and second multipliers.

15. The system of claim 14, wherein the controller is coupled to receive the demodulated signal, a filtered version of the demodulated signal, and a noise signal and to generate the first control value and the second control value, based at least in part thereon.

16. The system of claim 15, wherein the controller includes a first circuit to generate an average value of the demodulated signal and the noise signal, wherein the first circuit includes a first controllable filter to filter the demodulated signal to obtain the average value of the demodulated signal and a second controllable filter to filter the noise signal to obtain the average value of the noise signal, wherein a bandwidth of the first and second controllable filters is based on a comparison between the average value of the noise signal and the noise signal.

17. The system of claim 16, wherein the controller includes a second circuit to generate a noise floor based on the noise signal, wherein the second circuit includes a controllable filter to filter the noise signal to obtain the noise floor, wherein a bandwidth of the controllable filter is based on a comparison between the noise floor and a thresholded noise signal.

18. The system of claim 13, wherein the controller is to estimate a RMS value of the demodulated signal and a noise signal, estimate a noise floor based on the noise signal, and generate a blend control signal based on the RMS values and the noise floor, the blend control signal to be used to control the blending of the first and second paths.

19. The system of claim 13, wherein the DSP is to not blend the first and second paths if multipath noise is not detected.

* * * * *